United States Patent
Hoover et al.

(10) Patent No.: US 10,347,003 B1
(45) Date of Patent: *Jul. 9, 2019

(54) SYSTEMS AND METHODS FOR TRACKING OBJECTS IN AN ENVIRONMENT

(71) Applicant: Capital One Services, LLC, McLean, VA (US)

(72) Inventors: Jason Hoover, Grapevine, TX (US); Geoffrey Dagley, McKinney, TX (US); Micah Price, Plano, TX (US); Stephen Wylie, Carrollton, TX (US); Qiaochu Tang, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,760

(22) Filed: Nov. 21, 2018

Related U.S. Application Data

(63) Continuation of application No. 16/029,160, filed on Jul. 6, 2018, now Pat. No. 10,176,593.

(51) Int. Cl.
| | |
|---|---|
| *G06T 7/70* | (2017.01) |
| *G06K 9/00* | (2006.01) |
| *G06T 7/20* | (2017.01) |
| *H04N 5/33* | (2006.01) |

(52) U.S. Cl.
CPC ............ *G06T 7/70* (2017.01); *G06K 9/00771* (2013.01); *G06T 7/20* (2013.01); *H04N 5/33* (2013.01); *G06K 2209/23* (2013.01); *G06T 2207/10048* (2013.01); *G06T 2207/20072* (2013.01); *G06T 2207/30232* (2013.01)

(58) Field of Classification Search
CPC .......... G06T 7/70; G06T 7/20; G06K 9/00771
See application file for complete search history.

(56) References Cited

U.S. PATENT DOCUMENTS

| | | |
|---|---|---|
| 7,180,420 B2 | 2/2007 | Maurer |
| 7,327,251 B2 * | 2/2008 | Corbett, Jr. ........ G08B 21/0261 340/5.2 |
| 7,957,900 B2 | 6/2011 | Chowdhary et al. |
| 2002/0128769 A1 | 9/2002 | Der Ghazarian et al. |
| 2006/0173756 A1 | 8/2006 | Benight |
| 2007/0057817 A1 | 3/2007 | Aman |

OTHER PUBLICATIONS

Automap Tracking Solutions, "Inventory Tracking Solutions for Car Dealers", www.automap.us, Printed Jul. 6, 2018.

* cited by examiner

*Primary Examiner* — Nam D Pham
(74) *Attorney, Agent, or Firm* — DLA Piper LLP US

(57) ABSTRACT

Systems and methods for locating and/or tracking objects in an environment are discussed. The system may include non-visible light emitters and a camera and server system including an image geometry module configured to determine the location of an identified object in the environment. Objects may be identified based on a predefined frequency and/or pattern of pulses.

20 Claims, 4 Drawing Sheets

SYSTEMS AND METHODS FOR TRACKING OBJECTS IN AN ENVIRONMENT

CROSS-REFERENCE TO RELATED APPLICATIONS

This is a continuation of U.S. application Ser. No. 16/029,160 filed Jul. 6, 2018, the content of which is hereby incorporated by reference in its entirety.

TECHNICAL FIELD

The present disclosure is directed towards locating and/or tracking objects within an environment.

BACKGROUND

Conventional methods for tracking objects in an environment may include the manual tagging of objects with a numbering system, a radio-frequency identification (RFID) tag, and/or a QR code. However, these methods do not provide information regarding the location of the objects before and after the tag on the object is read. Furthermore, these approaches may require that a tag reader is placed close to the object such that the object's location may be recognized by a tracking system. However, the objects may then move away from the tag reader and the object's location may no longer be accurately represented by the tracking system.

For example, in a car dealership a tag reader may be located at a central location, and the location of the car after it's tag has been screened by the tag reader may not be made available to a car dealership.

SUMMARY

In some embodiments, the systems and methods disclosed herein may provide means for locating and/or tracking objects within an environment. In some embodiments, the disclosed systems and methods may provide means for locating and/or tracking objects within the environment for the entirety of the time the object is within the environment.

In some embodiments, a method may include the steps of transmitting, by an emitter, a signal having at least one of a predefined frequency and predefined pattern, recording, by a camera device, the transmitted signal and an environment, identifying, by at least one of the camera device and a server system, an object associated with the recorded signal based on at least one of the predefined frequency and predefined pattern of the signal and, determining, by the server system, the location of the identified object in the environment.

In some embodiments, the method may also include the step of generating, by the server system, a heat map comprising the determined location of the identified object in the environment, and/or generating, by the server system, a recording of the determined location of the identified object in the environment over time. In some embodiments determining the location of the identified object in the environment may include imaging, by the camera device, a pre-configured object within the environment, identifying, by the server system, the location of a pre-configured object within the environment, and determining, by the server system, the location of the recorded signal relative to the location of the pre-configured object. In some embodiments, the method may also include the step of displaying the determined location of the identified object on a user computing device. In some embodiments, the transmitted signal may include non-visible spectrum light. In some embodiments, the method may include the step of storing the determined location of the identified object in a database communicatively coupled to the server system. In some embodiments, the object is a vehicle.

In some embodiments, a system may include an emitter configured to transmit a signal having at least one of a predefined frequency and predefined pattern, a camera device configured to record the transmitted signal and an environment, and a server system comprising at least one processor and non-transitory memory. The server system may be configured to determine the location of an object associated with the recorded signal within the environment. In some embodiments at least one of the camera device and the server system of the system is configured to determine the object associated with the recorded signal. In some embodiments, the system includes a database configured to store the determined location of the object associated with the recorded signal within the environment. In some embodiments, the system includes a user interface configured to display the determined location of the object associated with the recorded signal. In some embodiments, the server system is further configured to generate at least one of a heat map comprising the determined location of the object and a recording of the determined location of the object over time. In some embodiments, the transmitted signal includes non-visible spectrum light. In some embodiments, the object is a vehicle. In some embodiments, a method may include a server receiving a recorded signal from a camera device having at least one of a predefined frequency and a predefined pattern, receiving a recording of an environment and determining the location of an identified object within the environment based on the received recorded signal and recording of the environment.

In some embodiments, the method may include identifying, by the server, an object associated with the recording signal based on at least one of the predefined frequency and the predefined pattern. The method may also include the step of generating, by the server, at least one of a heat map comprising the determined location of the object and a recording of the determined location of the object over time. In some embodiments, the recorded signal may include non-visible spectrum light. In some embodiments, the identified object is a vehicle.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Disclosed herein are improved system and methods to locate and track objects within an environment.

In some embodiments, objects may include vehicles such as automobiles, trucks, trailers, rental equipment, snowmobiles, boats, and the like. The environment may include a parking lot, a dealership lot, a parking garage, a valet parking area, an airport parking location, a rental car location, and the like.

In some embodiments, the disclosed systems and methods may be used to track when vehicles enter, leave, or are present within an environment. For example, the disclosed systems and methods may be used to identify theft of vehicles, test drives and the like. Additionally, the disclosed systems and methods may be used to determine any links between positioning of a vehicle in a dealership environment and propensity towards sales.

Notwithstanding, the disclosure may not be so limited and any other living and/or non-living thing may be tracked without limiting the scope of the disclosure. For example, objects may include pets, packages, keys, wallets, robots, vehicles, carts, boxes, storage containers, shipping containers, cell phones, devices, clothing, and the like.

Figure 1:
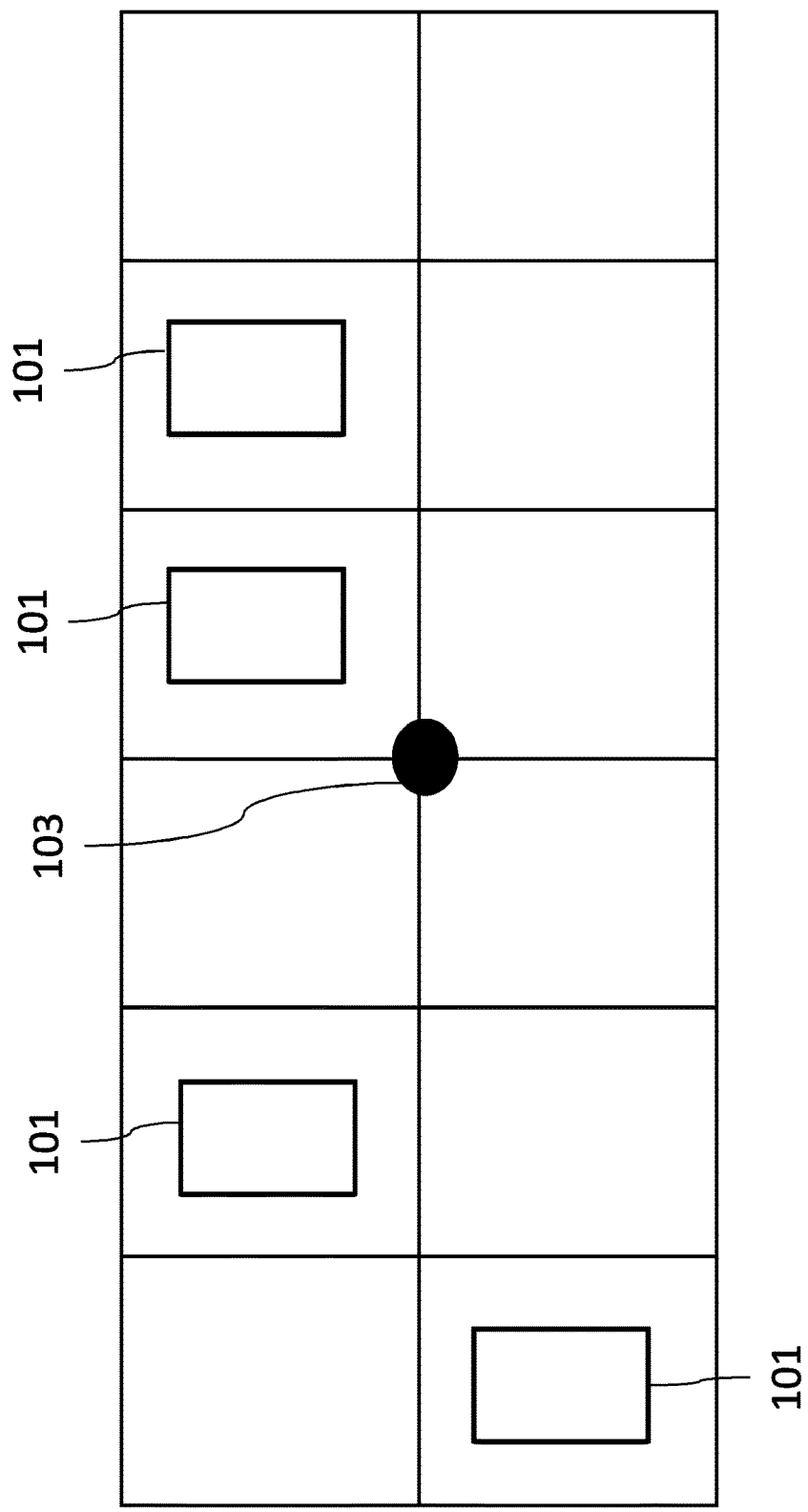
FIG. 1 is a diagram of a system built in in accordance with an embodiment of the present disclosure.

FIG. 1 is a diagram of an inventory system built in in accordance with an embodiment of the present disclosure. As illustrated in FIG. 1, one or more emitters 101 may be located within an environment. In some embodiments, each of the emitters 101 may be attached to an object. In one embodiment, the emitters 101 may emit a signal that is recorded by the camera 103 and used to determine the location of the emitters within the environment. In some embodiments, the emitters may be attached to vehicles and the illustrated system may be used for vehicle inventory.

Figure 2:
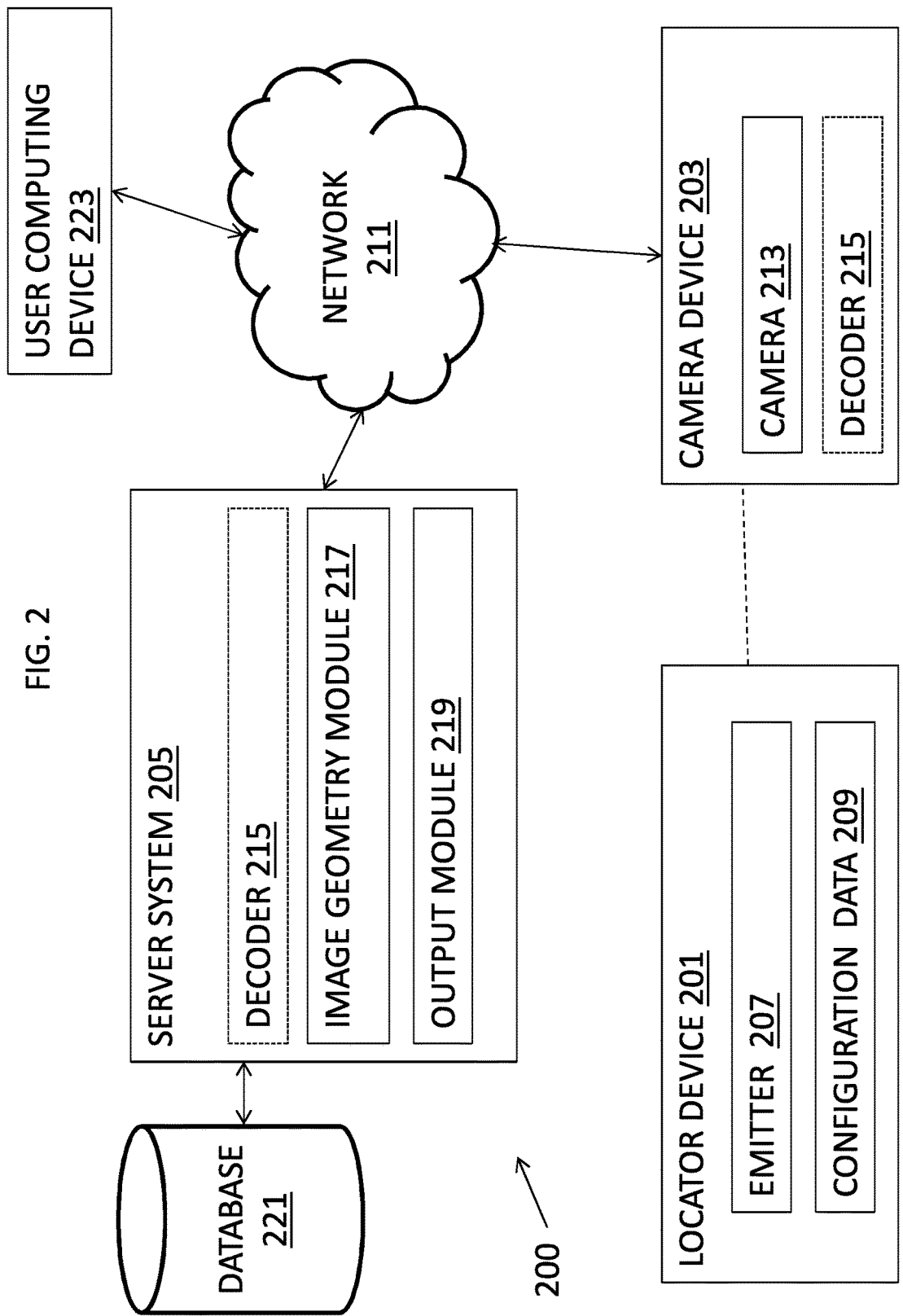
FIG. 2 is a system diagram for a system built in accordance with an embodiment of the present disclosure.

FIG. 2 is a system diagram for an system 200 built in accordance with an embodiment of the present disclosure. In some embodiments, the illustrated system 200 may be configured to determine and track the location of objects within an environment.

The illustrated system 200 includes a server system 205 communicatively coupled via a network 211 to a camera device 203 and a user computing device 223. The server system 205 may also be communicatively coupled to a database 221. The camera device may also send and/or receive signals from a locator device 201.

The locator device 201 may be configured to be placed on the object within the environment. In some embodiments, the object may be a vehicle. The locator device 201 may include an emitter 207 and configuration data 209. In some embodiments, each of a plurality of locator devices 201 in a system 200 may emit a specific and unique signal via the emitter 207 in accordance with the configuration data 209. For example, in some embodiments, an emitter 207 may emit a signal of a particular frequency or of a particular pattern of pulses. In some embodiments, the emitted signal may include non-visible spectrum light (e.g., infra-red light). The configuration data 209 may be configured to correspond with a particular object or location device 201.

The signal emitted by the emitter 207 of the locator device 201 may be recorded by the camera 213 of the camera device 203. In some embodiments, the camera 213 is configured to record the emitted signal, as well as an image of the environment. In some embodiments, the image of the environment may be a graphical image of the environment. In some embodiments, the image of the environment may be a recording of non-visible light received from the environment. In some embodiments, the camera device 203 may include a decoder 215 configured to decode the received signal emitted from the locator device 201 and identify the object that the received signal corresponds to. In other words, the decoder 215 may identify the locator device 201 and/or object associated with the received frequency or pattern of pulses. This process may be referred to herein as decoding. In some embodiments, the camera device 203 may be a camera configured to have a 360-degree view of an environment and be configured to receive and/or record non-visible light (e.g., infra-red light).

In some embodiments, the decoder 215 may be located on the server system 205, and the camera device 213 may transmit a non-processed recording or minimally processed recording to the server system 205 for decoding by the decoder 215. Alternatively, in an embodiment, the camera device 203 may transmit the recorded image and/or the determined corresponding locator device 201 and/or object information to the server system 205 for further processing.

The camera device 203 may communicate (send and/or receive) signals with the server system 205 by way of a network 211. In some embodiments, network 211 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks.

The server system 205 may receive data from the camera device 203. This may include data from the recorded signal from the locator device 201, and/or data reflective of the environment. In some embodiments, the server system 205 may include an image geometry module 217 and/or an output module 219. The image geometry module 217 may be configured to determine the location from which the locator device 201 is emitting a signal from within the environment.

To determine the location from which the locator device 201 is emitting a signal from within the environment, the image geometry module 217 may use the received data from the camera device 203 that is reflective of the environment. This may include a graphical image of the environment, a recording of non-visible light received from the environment, and the like.

In some embodiments, the location from which the locator device 201 is emitting a signal from within the environment, may be determined based on a series of images received from a plurality of camera devices 203. For example, signals received by multiple camera devices 203 from a particular locator device 201 can be combined by the decoder 215 or image geometry module 217 to determine the location of the locator device 201 within the environment.

Additionally, the received data reflective of the environment may include an image of a pre-configured object within the environment. For example, the pre-configured object may be located a set distance (e.g., 20 feet away) at a specified location (e.g., 30 degrees away) from the camera. Accordingly, when an image of the pre-configured object is received in addition to the signal from the locator device 201, the position of the locator device 201 relative to the pre-configured object may be determined. Using the position of the locator device 201 relative to the pre-configured object the image geometry module 217 may then determine the location of the identified object within the environment. Example pre-configured objects may include a marking on the ground, a pole, an light source, and the like.

In some embodiments, calibration information for each of the camera devices 203 in the environment, may be used by the image geometry module 217 to determine the location of the camera devices 203 in the environment, and to determine the location of the locator devices 201 within the environment depicted by the camera devices 203. For example, calibration information may include the height, elevation, geometry, and position of the camera devices 203 within the environment. For example, the camera device 203 may have varied heights based on the location of the camera device 203 along a pole or a hill. Moreover, the calibration information may be used to create a map of the environment based on the geographical characteristics of the environment (e.g., elevation, terrain, etc.).

In some embodiments, the image geometry module 217 may receive a series of images from a camera device 203 having a 360-degree view (i.e., "a 360-degree camera device"). In such an embodiment, locator devices 201 located closer to the 360-degree camera device may appear larger in the obtained image than objects located farther away from the 360-degree camera device. Moreover, in some embodiments, the image geometry module 217 may determine the placement of objects on a created map of the environment, where the objects correspond to the locator devices 201.

The image geometry module 217 may be configured to assemble the received series of images into a video sequence. The series of images may be received from one or more camera devices 203. In some embodiments, image geometry module 217 may filter the images to a particular wavelength in order to determine the location of the identified object within the environment. The image geometry module 217 may then determine a correspondence of the location of the identified object with a configuration file that includes the location of one or more pre-configured objects.

In some embodiments, one or more of the pre-configured reference objects (i.e., reference emitters) may also be configured to emit a particular wavelength or sequence of emissions for detection by the camera. The reference emitters may be configured to be positioned at the bounds of the environment and/or preset locations. The detection of the reference emitters at present locations and/or bounds may help in determining the location of identified objects within the environment by the image geometry module 217. In some embodiments, this may be based at least upon relative distances between the identified objects and the reference emitters.

In some embodiments, the image geometry module 217 may also determine the location of objects within the environment at least based on the intensity of the signals received from the objects. For example, the intensity of the signal may be inversely related to the distance the emitting signal is from the camera device 205.

In some embodiments, the image geometry module 217 may be further configured to generate a heatmap, chart, or figure for displaying the location of one or more locator devices 201 in the environment. In some embodiments, the image geometry module 217 may receive a series of images or recordings from the camera device 203 and generate a recording of the determined location for one or more identified objects in the environment over time.

In some embodiments, an output module 219 on the server system 205 may be configured to display the determined location of the identified object in the environment on a user computing device 223. In some embodiments, the output module 219 may be configured to generate a report that is specially optimized for display on an interface of a user computing device 223. The server system 205 may also communicate with the user computing device 223 via the network 211. In some embodiments, the user computing device 223 may include a desktop, laptop, tablet, cell phone, and the like.

In some embodiments, the database 221 may be configured to store the determined location of an object in the environment. The database 221 may also store historical locations for an object in the environment. The database 221 may also store information regarding objects. In a non-limiting example where the objects are vehicles, the vehicle make, model, year, manufacturer date, vehicle color, mileage, and the like may be stored in the database 221. In some embodiments, the database 221 may store data and information derived from the determined location of objects within the environment such as heatmaps, recordings, and the like.

In some embodiments, a system may include one or more locator devices 201 and one or more camera devices 203 operating constructively in an environment in accordance with the systems and methods described herein.

Figure 3:
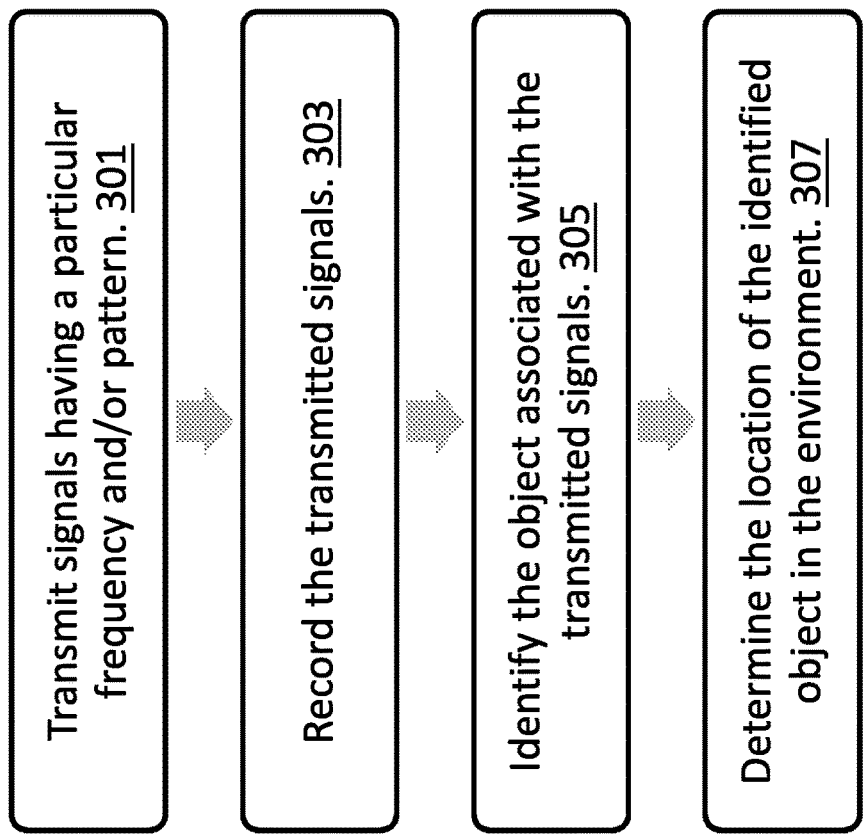
FIG. 3 is a flowchart for a process performed by a system built in accordance with an embodiment of the present disclosure.

FIG. 3 is a flowchart for a process performed by a system built in accordance with an embodiment of the present disclosure. In some embodiments, the illustrated process may be configured to determine and track the location of objects within an environment. As illustrated in FIG. 3, at step 301 signals having a particular frequency and/or pattern may be transmitted, for example, from a locator device 201 to a camera device 203. At step 303, the transmitted signals may be recorded, for example, by a camera device such as camera device 203. At step 305, the objects associated with the transmitted signals may be identified. As discussed above, this may be done via decoder such as decoder 215 located at the camera device 203 and/or the server system 205. At step 307, the location of the identified object in the environment may be determined. As discussed above, this may be done by an image geometry module 217 at the server system 205.

Figure 4:
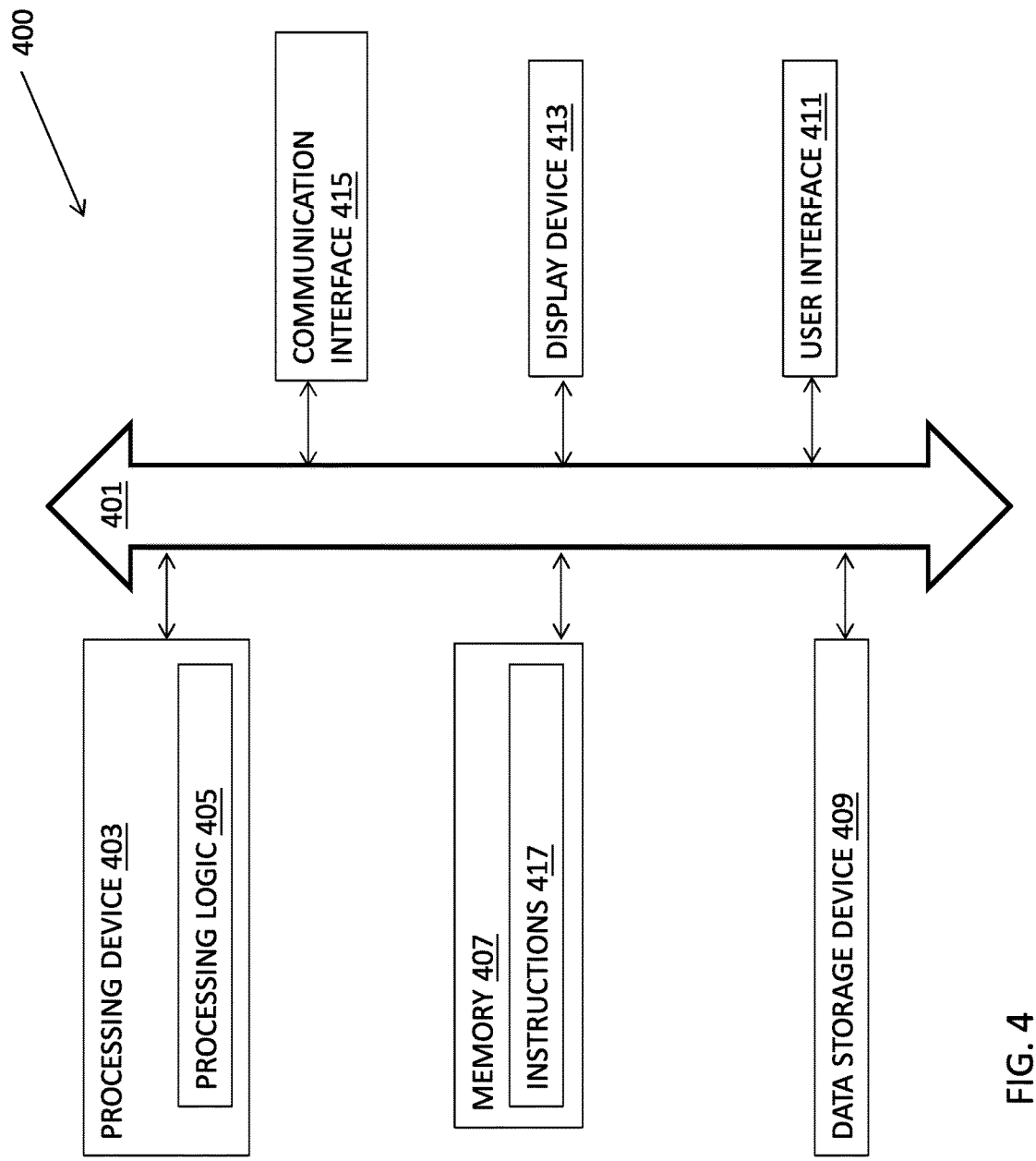
FIG. 4 is a system diagram for a computing device used in a system built in accordance with an embodiment of the present disclosure.

FIG. 4 is a system diagram for a computing device used in a system built in accordance with an embodiment of the present disclosure. FIG. 4 illustrates a functional block diagram of a machine in the example form of computer system 400, within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, each of the user computing device 223, server system 205, camera device 203 and/or locator device 201 of FIG. 2 may be implemented by the example machine shown in FIG. 4 (or a combination of two or more of such machines).

Example computer system 400 may include processing device 403, memory 407, data storage device 409 and communication interface 415, which may communicate with each other via data and control bus 401. In some examples, computer system 400 may also include display device 413 and/or user interface 411.

Processing device 403 may include, without being limited to, a microprocessor, a central processing unit, an application specific integrated circuit (ASIC), a field programmable gate array (FPGA), a digital signal processor (DSP) and/or a network processor. Processing device 403 may be configured to execute processing logic 405 for performing the operations described herein. In general, processing device 403 may include any suitable special-purpose processing device specially programmed with processing logic 405 to perform the operations described herein.

Memory 407 may include, for example, without being limited to, at least one of a read-only memory (ROM), a random access memory (RAM), a flash memory, a dynamic RAM (DRAM) and a static RAM (SRAM), storing computer-readable instructions 417 executable by processing device 403. In general, memory 407 may include any suitable non-transitory computer readable storage medium storing computer-readable instructions 417 executable by processing device 403 for performing the operations described herein. Although one memory device 407 is illustrated in FIG. 4, in some examples, computer system 400 may include two or more memory devices (e.g., dynamic memory and static memory).

Computer system 400 may include communication interface device 411, for direct communication with other computers (including wired and/or wireless communication), and/or for communication with network 211 (see FIG. 2). In some examples, computer system 400 may include display device 413 (e.g., a liquid crystal display (LCD), a touch sensitive display, etc.). In some examples, computer system 400 may include user interface 411 (e.g., an alphanumeric input device, a cursor control device, etc.).

In some examples, computer system 400 may include data storage device 409 storing instructions (e.g., software) for performing any one or more of the functions described herein. Data storage device 409 may include any suitable non-transitory computer-readable storage medium, including, without being limited to, solid-state memories, optical media and magnetic media.

Although the present disclosure may provide a sequence of steps, it is understood that in some embodiments, additional steps may be added, described steps may be omitted, and the like. Additionally, the described sequence of steps may be performed in any suitable order.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

We claim:

1. A method comprising:
   transmitting, by an emitter, a signal;
   recording, by a camera device, the transmitted signal and an environment;
   identifying, by at least one of the camera device and a server system, an object associated with the recorded signal based on at least one characteristic of the signal; and
   determining, by the server system, the location of the identified object in the environment.

2. The method of claim 1, wherein the signal comprises at least one of a predefined frequency and predefined pattern.

3. The method of claim 1, further comprising:
   generating, by the server system, a heat map comprising the determined location of the identified object in the environment.

4. The method of claim 1, further comprising:
   generating, by the server system, a recording of the determined location of the identified object in the environment over time.

5. The method of claim 1, wherein determining, the location of the identified object in the environment further comprises:
   imaging, by the camera device, a pre-configured object within the environment;
   identifying, by the server system, the location of a pre-configured object within the environment; and
   determining, by the server system, the location of the recorded signal relative to the location of the pre-configured object.

6. The method of claim 1, further comprising:
   displaying the determined location of the identified object on a user computing device.

7. The method of claim 1, wherein the transmitted signal comprises non-visible spectrum light.

8. The method of claim 1, further comprising:
   storing the determined location of the identified object in a database communicatively coupled to the server system.

9. A system comprising:
   an emitter configured to transmit a signal;
   a camera device configured to record the transmitted signal and an environment; and
   a server system comprising at least one processor and non-transitory memory, said server system configured to determine the location of an object associated with the recorded signal within the environment.

10. The system of claim 9, wherein the signal comprises at least one of a predefined frequency and a predefined pattern.

11. The system of claim 9, wherein at least one of the camera device and the server system is configured to determine the object associated with the recorded signal.

12. The system of claim 9, further comprising:
    a database configured to store the determined location of the object associated with the recorded signal within the environment.

13. The system of claim 9, further comprising:
    a user interface configured to display the determined location of the object associated with the recorded signal.

14. The system of claim 9, wherein the server system is further configured to generate at least one of a heat map comprising the determined location of the object and a recording of the determined location of the object over time.

15. The system of claim 9, wherein the transmitted signal comprises non-visible spectrum light.

16. A method comprising:
    receiving, by a server, a recorded signal from a camera device;

receiving, by the server, a recording of an environment; and determining, by the server, the location of an identified object within the environment based on the received recorded signal and recording of the environment.

17. The method of claim 16, further comprising:

identifying, by the server, an object associated with the recording signal based on at least one of a predefined frequency and a predefined pattern.

18. The method of claim 16, further comprising:

generating, by the server, at least one of a heat map comprising the determined location of the object and a recording of the determined location of the object over time.

19. The method of claim 16, wherein the recorded signal comprises non-visible spectrum light.

20. The method of claim 16, wherein the identified object is a vehicle.

\* \* \* \* \*